United States Patent [19]
Lawson et al.

[11] Patent Number: 5,334,665
[45] Date of Patent: * Aug. 2, 1994

[54] LIQUID DIENE POLYMERS AND COPOLYMERS TERMINATED BY REACTION WITH FUSED-RING POLYNUCLEAR AROMATIC COMPOUNDS

[75] Inventors: David F. Lawson, Uniontown; Mark L. Stayer, Jr., Mogadore; Thomas A. Antkowiak, Rittman, all of Ohio

[73] Assignee: Bridgestone/Firestone, Inc., Akron, Ohio

[ * ] Notice: The portion of the term of this patent subsequent to May 11, 2010 has been disclaimed.

[21] Appl. No.: 58,340

[22] Filed: May 6, 1993

Related U.S. Application Data

[63] Continuation-in-part of Ser. No. 812,258, Dec. 20, 1991, Pat. No. 5,210,145.

[51] Int. Cl.$^5$ ............................................. C08F 8/00
[52] U.S. Cl. .................... 525/289; 525/332.8; 525/332.9; 525/333.1; 525/333.2; 525/383; 525/55; 552/286; 552/288; 552/290; 552/291
[58] Field of Search .............. 552/286, 288, 290, 291; 525/332.8, 332.9, 333.1, 333.2, 289

[56] References Cited

U.S. PATENT DOCUMENTS 4,297,451 10/1981 Uraneck et al. .................... 525/366

*Primary Examiner*—Bernard Lipman
*Attorney, Agent, or Firm*—Frank J. Troy, Sr.

[57] ABSTRACT

A terminally functionalized liquid polymer is prepared by reacting a low molecular weight living diene polymer or copolymer obtained by anionic polymerization of a diene monomer or mixture of a diene monomer and a vinyl aromatic hydrocarbon monomer with a fused-ring polynuclear aromatic compound. The resultant terminally functionalized liquid diene polymers or copolymers can be utilized as dispersants for particulates such as carbon black or graphite and may also be employed as viscosity modifiers for lubricating oils or in electrorheological devices or damping devices.

6 Claims, No Drawings

LIQUID DIENE POLYMERS AND COPOLYMERS TERMINATED BY REACTION WITH FUSED-RING POLYNUCLEAR AROMATIC COMPOUNDS

CROSS-REFERENCE TO RELATED APPLICATIONS

This application is a continuation-in-part of U.S. application Ser. No. 812,258 filed Dec. 20, 1991, now U.S. Pat. No. 5,210,145.

BACKGROUND OF THE INVENTION

The invention relates to terminally functionalized liquid diene polymers and copolymers. More particularly, the invention relates to liquid diene polymers and copolymers containing terminals derived from fused-ring polynuclear aromatic compounds.

Diene polymers and copolymers containing certain terminal functional groups are known in the art. Such polymers depending on their particular terminal functional group exhibit reduced hysteresis properties in the carbon black reinforced and cured state and elastomeric compositions containing the polymers are often utilized to form tire treads having reduced rolling resistance and good traction properties. Diene polymers and copolymers of the aforementioned type are illustrated by the following patents:

U.S. Pat. No. 4,835,209 discloses the termination of living diene polymer or copolymer chains with carbodiimides. The patent discloses that rubber compositions containing such polymers have excellent performance characteristics with respect to tensile strength, impact resistance, low heat-generating properties and wear resistance without impairing wet skid properties.

U.S. Pat. No. 4,816,520 relates to terminally functionalized polymers, including diene polymers and copolymers and a process for their preparation. The reference discloses that the terminally functionalized polymers are prepared from living polymers obtained by anionic polymerization of olefinically unsaturated monomers by first reacting the living polymers with capping reagents comprising various nitrogen compounds including substituted imines (Schiff bases) and diaziridines and then reacting the capped polymer with a terminating agent which contains halogen or acid anhydride groups. Capping reagents which are disclosed include among others a compound of the formula

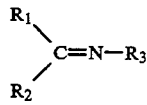

wherein $R_1$ is H, alkyl, cycloalkyl or aryl and $R_2$ and $R_3$ are each alkyl, cycloalkyl or aryl. Terminating agents which are disclosed include halogen compounds such as chloromethylstyrenes, acryloyl chloride, methacryloyl chloride, epichlorohydrin, etc.

U. S. Pat. No. 4,935,471 discloses the termination of living diene polymer or copolymer chains with a capping agent selected from the group consisting of (a) halogenated nitriles having the structural formula $X-A-C\equiv N$ wherein X is a halogen atom and A is an alkylene group of 1 to 20 carbon atoms, (b) heterocyclic aromatic nitrogen-containing compounds, and (c) alkyl benzoates. This patent discloses that compositions containing such polymers have reduced hysteresis and that tire treads made from such compositions have lower rolling resistance and better traction characteristics.

SUMMARY OF THE INVENTION

In accordance with the present invention, liquid diene polymers and copolymers containing terminals derived from fused-ring polynuclear compounds are provided. The polymers are prepared by reacting a low molecular weight living polymer obtained by anionic polymerization of a diene monomer or mixture of a diene monomer and a vinyl aromatic hydrocarbon monomer with a fused-ring polynuclear aromatic compound.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to terminating reactions.

The liquid diene polymers or copolymers of the invention are prepared by a process which involves first preparing a low molecular weight living diene polymer or copolymer containing active organoalkali or organoalkaline earth metal terminals by anionic polymerization of a conjugated diene monomer or mixture of a conjugated diene monomer and a vinyl aromatic hydrocarbon monomer and then terminating the living diene polymer or copolymer chains by reacting the active terminals thereof with a fused-ring polynuclear aromatic compound.

The living diene polymer or copolymer employed in preparing the liquid polymers of the invention is as indicated a polymer of low molecular weight. Thus, such polymers may have number average molecular weights, Mn, ranging from about 200 to about 50,000, preferably from about 500 to 20,000.

The living diene polymer is a polymer of a conjugated diene and the living diene copolymer is a random copolymer of a conjugated diene and a vinyl aromatic hydrocarbon.

Conjugated dienes which may be utilized in preparing the living polymers and copolymers include 1, 3-butadiene, 2-methyl-1, 3-butadiene (isoprene), 2,3-dimethyl-1,3-butadiene, 1,3-pentadiene, 1,3-hexadiene and the like as well as mixutres thereof. The preferred diene is 1,3-butadiene.

Vinyl aromatic hydrocarbons which may be utilized in preparing the living copolymers include styrene, vinyl toluene, alpha-methyl styrene, vinyl naphthalene, vinyl pyridine and the like. The preferred vinyl aromatic hydrocarbon is styrene.

The living polymers can be prepared in a well known manner by polymerizing the monomer or monomers in a hydrocarbon solvent in the presence of an anionic initiator. In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the preparation of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyllithium, phenyllithium, tolyllithium and the like. A particularly preferred initiator is n-butyllithium.

It is also possible to employ as the anionic initiator an initiator formed by reacting a functionalizing agent with the above-described organolithium initiators. Thus, such initiators can be formed by reacting a functionalizing agent selected from the group consisting of substituted aldimines, ketimines and secondary amines with the organolithium compound. For example, an anionic initiator of this type can be formed by reacting a substituted aldimine such as dimethylamino benzylidene methylamine with n-butyllithium. A number of initiators of this type are described in our pending U.S. application Ser. No. 506,306 to Antkowiak et al filed Apr. 9, 1990, now U.S. Pat. No. 5,066,729, the disclosure of which is incorporated herein by reference.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'- tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare copolymers of the invention may have diene contents of from about 99 to 20 percent by weight and vinyl aromatic hydrocarbon contents of from about 1 to about 80 percent by weight with the preferred copolymers having diene contents of from 90 to 50 percent by weight and vinyl aromatic hydrocarbon contents of from 10 to 50 percent by weight.

The living polymers of conjugated dienes and random copolymers of conjugated dienes and vinyl aromatic hydrocarbons employed to prepare the polymers and copolymers of the invention may have 1,2-microstructure contents ranging from about 10 to about 80 percent with the preferred polymers or copolymers having 1,2-microstructure contents of from 15 to 65 percent. The preparation of diene polymers or copolymers having a particular 1,2-microstructure content is dependent on a number of factors including the specific initiator, the type polar modifier, the modifier to initiator ratio and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerization", Journal of Polymer Science, Part A-1, Vol. 10, pages 1319–1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content.

The terminally functionalized liquid polymers of the invention are prepared by reacting the above living polymers, preferably in solution in the hydrocarbon solvent in which they were prepared, with the fused-ring polynuclear aromatic compound. By the term "fused-ring" is meant a structure in which two or more benzene or other aromatic rings (or substituted aromatics, i.e. the higher dialkyl, aralkyl, or aryl analogues) are joined together at more than one carbon; i.e. the rings share two or more carbons in common. The term "fused-ring" aromatic implies compounds with two or more rings. Although some reactive functional naphthalenes may be effective in the present invention, fused-ring aromatic systems having three or more rings are preferred; hence, the reference to fused-ring polynuclear aromatic compounds.

Fused-ring polynuclear aromatic compounds which may be employed include those having a suitably reactive functional group such as the keto or aldo carbonyl, pendent vinyl or reactive internal double bond including among others derivatives of anthracenes, benzanthrenes, phenanthrenes, benzphenethrenes, pyrenes, benzopyrenes, benzanthracenes, benzoquinolines, and their higher fused-ring analogues, providing that sufficient solubility exists for reaction with living polymer. Fused-ring polynuclear aromatic compound derivatives having reactive functional groups that can react with more than one mole of living polymer per mole of fused-ring compounds should be avoided. Illustrative examples of suitable compounds include benzanthrone, 1-pyrenecarboxaldehyde, perinaphthenone, phenanthrene-9-carboxaldehyde, vinylphenanthrenes, 9-vinylanthracene and the like. The preferred fused-ring polynuclear aromatic compound is benzanthrone.

The reaction of the living polymer in solution with the terminating agent can be conducted if desired by simply adding the terminating agent per se to the polymer solution. However, it is generally preferred to add the terminating agent in the form of a solution thereof in an appropriate solvent for ease of handling.

The amounts of terminating agent added to the living polymer are dependent upon the amounts of live organoalkali metal end groups (e.g. live lithium end groups) present in the living polymer and the amounts of terminating agent desired in the finished polymer. It will be noted that the number of moles of live alkali metal end groups in the living polymer is presumed to be equivalent to the number of moles of alkali metal groups present in the organoalkali metal initiator utilized to effect polymerization. In general, the amount of terminating agent employed to react with the live alkali metal groups of the living polymer herein may range from less than stoichiometric, i.e. 0.75 moles of terminating agent per mole of live alkali metal end groups, to stoichiometric, i.e. about 1 mole of terminating agent per mole of live alkali metal end groups, to a large excess of terminating agent. However, from about 0.9 to 2.0 moles of terminating agent per mole of alkali metal end groups is preferred.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about 0° C. to about 100° C. with the preferred temperatures ranging from 30° C. to 100° C. and especially preferred temperatures ranging from 50° C. to 80° C. The reaction times may also vary considerably and are, in general, dependent upon reaction temperatures. Hence, the reaction times may range from about 15 minutes to about 24 hours.

After the terminating reaction is complete, it is generally desirable to quench the polymer mixture in order to deactivate any live alkali metal end groups (e.g. lithium end groups) which may remain. This serves to prevent the living polymer from reacting with any carbon dioxide or oxygen which may be present. The quenching reaction can be conducted in known manner by adding a conventional polymer terminating agent such as water or an alcohol (e.g. isopropanol) to the polymer solution.

The resultant terminally functionalized liquid polymer can be recovered from the polymer solution and dried using conventional procedures. Thus, for example, the polymer can be recovered from solution by direct drum drying, extruder drying, air drying, spray drying, vacuum drying or by coagulation either by adding a sufficient volume of a non-solvent liquid (e.g. an alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The following examples are submitted for the purpose of further illustrating the nature of the present invention and should not be regarded as a limitation on the scope thereof. Parts and percentages shown in the examples are by weight unless otherwise indicated.

EXAMPLE 1

Preparation of Low Molecular Weight Living Oligomer, and Termination with a Fused-Ring Polynuclear Aromatic Compound A "living" low molecular weight oligobutadiene was prepared in a one-gallon reactor by adding 1.42 lb of a 25% mixture of 1,3-butadiene in hexane to 670 ml of a 1.5M solution of n-butyllithium in hexane (=623 mmol of n-BuLi per hundred grams of monomer, theoretical molecular weight of oligomer ≈225, estimated concentration ~0.6M, {Li}=0.889 mmol per gram of solution). The reactor was heated at 100°–110° F. during the addition, and the butadiene was added in several small increments in order to avoid overheating. The reaction was allowed to proceed for 2.5 hr after addition was complete, while heating at 120°–130° F. A 6.3 g sample of the reaction product was collected in a dried, nitrogen-purged, bottle sealed with a Viton cap-liner, through a heavy-gauge hypodermic needle fitted to the reactor. This solution was terminated by reaction for about one hour at 50° C. with 50.9 ml of a 0.11M solution of benzanthrone in toluene (1 benzanthrone/Li). The product contained in this mixture, after quenching with alcohol and water, filtration, and evaporation of solvents, was an oily, mobile fluid.

EXAMPLE 2

Preparation of Low Molecular Weight Living Polymer, and Termination with a Fused-Ring Polynuclear Aromatic Compound A large beverage bottle, fitted as described in the previous example, was charged with 58.2 g of a 25% by weight blend of butadiene in hexanes. To this was charged 2.12 ml of a 1.7M solution of n-butyllithium in hexane. The molecular weight of the polybutadiene anticipated from this charge ratio was about 4000. After agitating and heating this polymerization mixture for 3 hrs at 50° C., the mixture was treated for 1.5 hr at 50° C. with 25 ml of a 0.3 M solution of technical grade benzanthrone in anhydrous tetrahydrofuran (100 mol % excess of benzanthrone). The contents of the bottle were then allowed to cool to room temperature, the mixture was quenched with 1 ml of deaerated 2-propanol, then with 1 ml of distilled water, and then treated with 5 ml of a 2.3% by weight solution of di-t-butyl-p-cresol (DBPC) in hexanes, and coagulated by decanting into a vigorously-stirred 3-fold (by volume) excess of absolute ethanol containing 12 ml of the DBPC solution. After the coagulate had settled, the supernatant coagulant was decanted and the coagulation procedure was repeated using a four-fold excess of ethanol, and additional DBPC solution.

A small sample of the coagulate was extracted twice with a large excess of hot ethanol, more DBPC was added, and the residual polymer was dried for two hrs in a vacuum oven at 70°–80° C. The resulting neat polymer was viscous at room temperature, but it flowed readily when its container was tilted or inverted. The sample had $M_n=6419$, with $M_w/M_n=1.29$, determined by size exclusion chromatograph (SEC, or GPC). A strong UV absorption was detected through the entire molecular weight range of the polymer in the SEC analysis, indicating that an aromatic moiety was substantially incorporated into the polymer.

EXAMPLE 3

Suspension of Carbon Black in a Hydrocarbon Solvent

Three small beverage bottles were charged with 0.50 g of carbon black (N-330 black) and 49 g of an anhydrous mixture of hexanes. Nothing else was added to the first bottle (A). the second bottle (B) was charged with 0.25 g of the polymer from EXAMPLE 2. The third bottle (C) was charged with polybutadiene of $Mn=5700$, $Mw/Mn=1.03$, which had been prepared in a similar manner, except that there was no fused ring functionality introduced at the tail (i.e., while living, it was quenched with only alcohol). The three bottles were sealed and shaken vigorously for 5 minutes at room temperature, and the following observations were recorded:

| Time | Bottle A (no polymer) | Bottle B (polymer of invention) | Bottle C (unfunctionalized polybutadiene |
|---|---|---|---|
| 5 min | Carbon black had completely settled | Dispersed (black) | Dispersed (black) |
| 1 day | Carbon black had completely settled | Dispersed (black) | Dispersed (black, with gray just below surface) |
| 4 days | Carbon black had completely settled | Dispersed (black) | ~20% settled (dark gray) |
| 10 days | Carbon black had completely settled | Dispersed, with very slight settling | ~50% settled (medium gray) |

These observations demonstrated that the polymer of the invention was useful in promoting the suspension of a carbon black pigment in fluid medium. Moreover, its performance was superior to that of a polymer which was not treated with a fused-ring polynuclear aromatic compound.

We claim:

1. A terminally functionalized liquid polymer prepared by reacting a living polymer having a molecular weight $M_n$ of from about 200 to about 50,000 obtained by anionic polymerization of a diene monomer or a mixture of a diene monomer and vinyl aromatic hydrocarbon monomer with a fused-ring polynuclear aromatic compound capable of reacting with no more than 1 mole of living polymer per mole of said fused-ring polynuclear aromatic compound.

2. The terminally functionalized liquid polymer of claim 1 wherein said terminally functionalized polymer is a polymer of butadiene or a copolymer of butadiene and styrene.

3. The terminally functionalized liquid polymer of claim 1 wherein said fused-ring polynuclear aromatic compound is selected from the group consisting of derivatives of anthracenes, benzanthrenes, phenanthrenes, benzphenanthrenes, pyrenes, benzopyrenes, benzanthracenes, benzoquinolines and their higher fused-ring analogues.

4. The terminally functionalized liquid polymer of claim 1 wherein said fused-ring polynuclear aromatic compound is perinaphthenone.

5. The terminally functionalized liquid polymer of claim 1 wherein said fused-ring polynuclear aromatic compound is benzanthrone.

6. The terminally functionalized liquid polymer of claim 1 wherein said fused-ring polynuclear aromatic compound is selected from the group consisting of benzanthrone, 1-pyrene carboxaldehyde, perinapthenone, phenanthrene-9-carboxaldehyde, vinylphenanthrenes, and 9-vinylanthracene.

* * * * *